(12) United States Patent
Sathe et al.

(10) Patent No.: US 11,995,110 B2
(45) Date of Patent: May 28, 2024

(54) SYSTEMS AND METHODS FOR CANDIDATE DATABASE QUERYING

(71) Applicant: SucceedSmart, Inc., Los Altos, CA (US)

(72) Inventors: Sanjay Shrikrishna Sathe, Los Altos, CA (US); Javid Muhammedali, Wellesley, MA (US)

(73) Assignee: SucceedSmart, Inc., Los Altos, CA (US)

( * ) Notice: Subject to any disclaimer, the term of this patent is extended or adjusted under 35 U.S.C. 154(b) by 0 days.

(21) Appl. No.: 18/352,526

(22) Filed: Jul. 14, 2023

(65) Prior Publication Data

US 2024/0020324 A1 Jan. 18, 2024

Related U.S. Application Data

(60) Provisional application No. 63/389,323, filed on Jul. 14, 2022, provisional application No. 63/389,319, filed on Jul. 14, 2022.

(51) Int. Cl.
| | |
|---|---|
| *G06F 16/00* | (2019.01) |
| *G06F 16/31* | (2019.01) |
| *G06F 16/33* | (2019.01) |
| *G06F 16/332* | (2019.01) |
| *G06F 16/35* | (2019.01) |

(52) U.S. Cl.
CPC ........ *G06F 16/3325* (2019.01); *G06F 16/319* (2019.01); *G06F 16/3334* (2019.01); *G06F 16/355* (2019.01)

(58) Field of Classification Search
CPC . G06F 16/3325; G06F 16/3334; G06F 16/319

USPC .......................................................... 707/765
See application file for complete search history.

(56) References Cited

U.S. PATENT DOCUMENTS

| | | | | |
|---|---|---|---|---|
| 7,117,203 B2 * | 10/2006 | Gilfix | ............... | G06F 16/24561 |
| 7,870,117 B1 * | 1/2011 | Rennison | ............... | G06N 20/00 |
| | | | | 707/723 |
| 8,244,551 B1 * | 8/2012 | Mund | ................... | G06Q 10/10 |
| | | | | 705/320 |

(Continued)

FOREIGN PATENT DOCUMENTS

WO WO-2018018160 A1 * 2/2018 ........... A61B 5/0261

*Primary Examiner* — Monica M Pyo
(74) *Attorney, Agent, or Firm* — Goodwin Procter LLP

(57) ABSTRACT

Iterative search of a candidate resume database is performed using computer-implemented methods and accompanying systems, and includes the steps of generating a ranked list of search terms associated with a job candidate search, constructing a search query of the candidate resume database based on the ranked list of search terms, executing the search query on the candidate resume database in a count mode to generate a number of results, evaluating the number of results generated from the execution of the search query by comparing the number of results to individual thresholds within a set of thresholds. Upon determining that the number of results exceeds one or more thresholds, the methods further include retrieving the results from the candidate resume database. Upon determining that the number of results does not exceed one or more thresholds, the methods further include removing a restrictive term from the search query.

17 Claims, 7 Drawing Sheets

(56) References Cited

U.S. PATENT DOCUMENTS

| | | | |
|---|---|---|---|
| 9,558,271 B1* | 1/2017 | Sathe | G06F 16/367 |
| 10,748,118 B2* | 8/2020 | Fang | G06N 20/00 |
| 2009/0276209 A1* | 11/2009 | Dane | G06Q 10/063112 |
| | | | 704/9 |
| 2014/0324721 A1* | 10/2014 | Rennison | G06Q 50/2057 |
| | | | 705/321 |
| 2015/0127565 A1* | 5/2015 | Chevalier | G06Q 10/00 |
| | | | 705/319 |
| 2016/0005001 A1* | 1/2016 | Muhammedali | G06Q 50/01 |
| | | | 705/319 |
| 2017/0039281 A1* | 2/2017 | Venkata | G06F 16/24534 |
| 2017/0193451 A1* | 7/2017 | Fang | G06N 20/00 |
| 2017/0330153 A1* | 11/2017 | Muhammedali | G06Q 10/1053 |
| 2020/0125639 A1* | 4/2020 | Doyle | G06F 40/30 |
| 2022/0398445 A1* | 12/2022 | Polleri | G06F 16/3347 |

* cited by examiner

SYSTEMS AND METHODS FOR CANDIDATE DATABASE QUERYING

CROSS REFERENCE TO RELATED APPLICATIONS

This application claims the benefit of and priority to U.S. Provisional Patent Application No. 63/389,319 filed Jul. 14, 2022 and U.S. Provisional Patent Application No. 63/389,323 filed Jul. 14, 2022, the entire disclosure of each of which is hereby incorporated by reference in its entirety for all purposes.

TECHNICAL FIELD

The present disclosure generally relates to database search queries and, more particularly, to systems and methods for constructing a search query based on job descriptions to retrieve potential job candidates from a database, and iteratively searching the database for an optimal number of results associated with matching job candidates.

BACKGROUND

Currently, a large majority of conventional recruitment systems use a combination of keywords, concepts and 'hit' rankings to identify candidates who match a job or to find jobs that match a candidate's interests. For some types of jobs, especially high-end executive roles, this approach fails to yield a good quality or quantity of matching candidates. This can be because either, that executives do not mention specific skills in their profiles, or that the executive skills being looked for are so generic (e.g., "leadership") that too many matches are found. In addition, it is often not clear from the matched keywords whether the candidate would be a good fit for the role. For example, a person with expertise in buildings would be different from a person who is skilled at building teams. A person working in a data warehouse has very different skills from a person working in a wholesale warehouse.

Additionally, in many current search queries that are automatically generated by a machine learning, recommendation or keyword parsing system, the number of hits or results generated against each query can vary widely based on the number and Boolean operator applied to the query terms. In addition to the number, the composition of the query results may also vary. For example, a query looking for ski AND resorts within 10 miles of New York City may only return a handful of matches, but a query that allows for ski OR resorts would return a higher number of properties, which also include beach resorts, spa resorts, ski shops, ski schools, etc. This type of variability in the returned hits can be desirable for various use cases, including in recruitment where a diversity of candidates to be considered for a role is a requirement. Current techniques in resume search allow users to specify the parameters for each search as well as the Boolean operator that accompanies each parameter. For instance, if a job requires expertise in Java, Python, AWS and SQL Server, a recruiter will often make all these terms required in the initial search. If the search returns too few matches, then they might exclude one term, for example, simply search for Java, Python and AWS, but not SQL Server, and so on.

However, the above approach also has certain limitations. First, it relies on the incomplete knowledge of a recruiter to determine which terms to remove. Second, it eliminates people who may have a different combination of skills than the ones chosen. Third, it can be very cumbersome to implement when the list of terms becomes large. For example, selecting 3 terms from a list of 10 can yield 120 combinations. In addition, in ensemble-based recommendation systems where the same data set is queried multiple ways, there is often a high degree of repetition of the same results. Moreover, in cases where a query undershoots a threshold volume by being too selective, the results will overfit for rare terms, where many good matches would not be found. On the other hand, in cases where a query overshoots a desirable volume, the results have far too many matches, and thus other subsequent operations such as sorting or filtering will become less effective.

SUMMARY

The present disclosure solves these problems by summarizing and extracting from natural language documents a list of key accomplishments that are mentioned in the document, clustering them into classes of related accomplishments, and identifying those clusters that are particularly relevant for a given job.

Further, the present disclosure also solves these problems by toggling the required set of attributes in a resume search query using a ranked list of parameters that are based on the correlation between each parameter and the specific job characteristics and employer preferences. For instance, machine learning can be used to identify the most desirable terms and find a balanced number of hits, so that there are always a sufficient volume of matches to satisfy the variety and diversity criteria, and filters out an excessive number of hits to allow further refinement using sorting or filtering.

In an aspect, a computer-implemented method for iterative search of a candidate resume database is presented. The method includes generating a ranked list of search terms associated with a job candidate search. The method includes constructing a search query of a candidate resume database based on a ranked list of search terms. The method includes executing the search query on the candidate resume database in a count mode to generate a number of results. The method includes evaluating a number of results generated from the execution of the search query by comparing the number of results to individual thresholds within a set of thresholds. The method includes, upon determining that the number of results exceeds one or more thresholds of the set of thresholds, retrieving the results from the candidate resume database. The method includes, upon determining that the number of results does not exceed one or more thresholds of the set of thresholds, removing a restrictive term from the search query.

In another aspect, a computer-implemented method for searching a job candidate database is presented. The method includes receiving electronic text data associated with a job. The electronic text data includes a plurality of data fields. The fields include a job description. The method includes extracting from the plurality of data fields a set of phrases comprising expectations associated with the job. The method includes mapping each phrase to one or more clusters of accomplishments within a corpus of accomplishments. The method includes calculating a score of each of the one or more cluster of accomplishments. The method includes ranking the clusters of accomplishments based on the calculated scores. The method includes extracting a set of keywords from the ranked clusters of accomplishments. The method includes constructing a search query using a set of keywords. The method includes executing the search query to retrieve results comparing potential job candidates form the job candidate database.

In yet another aspect, a system for an iterative search of a candidate resume database is presented. The system includes a processor and a memory communicatively connected to the processor. The memory includes instructions configuring the processor to generate a ranked list of search terms associated with a job candidate search. The processor is configured to construct a search query of a candidate resume database based on the ranked list of search terms. The processor is configured to execute the search query on the candidate resume database in a count mode to generate a number of results. The processor is configured to evaluate the number of results generated from the execution of the search query by comparing the number of results to individual thresholds within a set of thresholds. Upon determining that the number of results exceeds one or more thresholds of the set of thresholds, the processor is configured to retrieve the results from the candidate resume database. Upon determining that the number of results does not exceed one or more thresholds of the set of thresholds, the processor is configured to remove a restrictive term from the search query.

BRIEF DESCRIPTION OF THE DRAWINGS

These and other features, aspects, and advantages of the present invention will become better understood with regard to the following description and accompanying drawings.

DETAILED DESCRIPTION

Various embodiments of the present invention are directed to systems and computer-implemented methods for determining and/or searching job candidates. Various components and features of systems and methods for predictions relating to customer orders, according to various embodiments, are described in greater detail below.

Overview of Features and Advantages

In general, the systems and methods as disclosed herein have certain features and/or advantages, some of which are described as follows.

First, the systems and methods as disclosed herein can automatically parse a text job description document and extracts top terms to find matching job candidates.

Second, the systems and methods as disclosed herein does not rely on matching just specific keywords that could lead to missing job candidates for lack of a word. Accordingly, the systems and methods as disclosed herein can reduce missed job candidates.

Third, the systems and methods as disclosed herein can tokenize and extract key accomplishments based on the whole sentence context instead of a single keyword to present to a recruiter. Accordingly, the systems and methods as disclosed herein can improve the accuracy and completeness of search.

Fourth, the systems and methods as disclosed herein can use models for accomplishments to capture nuances such as "building a team" vs. "building a shed" to find and score candidates.

Fifth, the systems and methods as disclosed herein can classify accomplishments as executive at a team and/or individual level.

Sixth, the systems and methods as disclosed herein can rank executive accomplishments based on proximity to the job role.

Candidate Search

Figure 1:
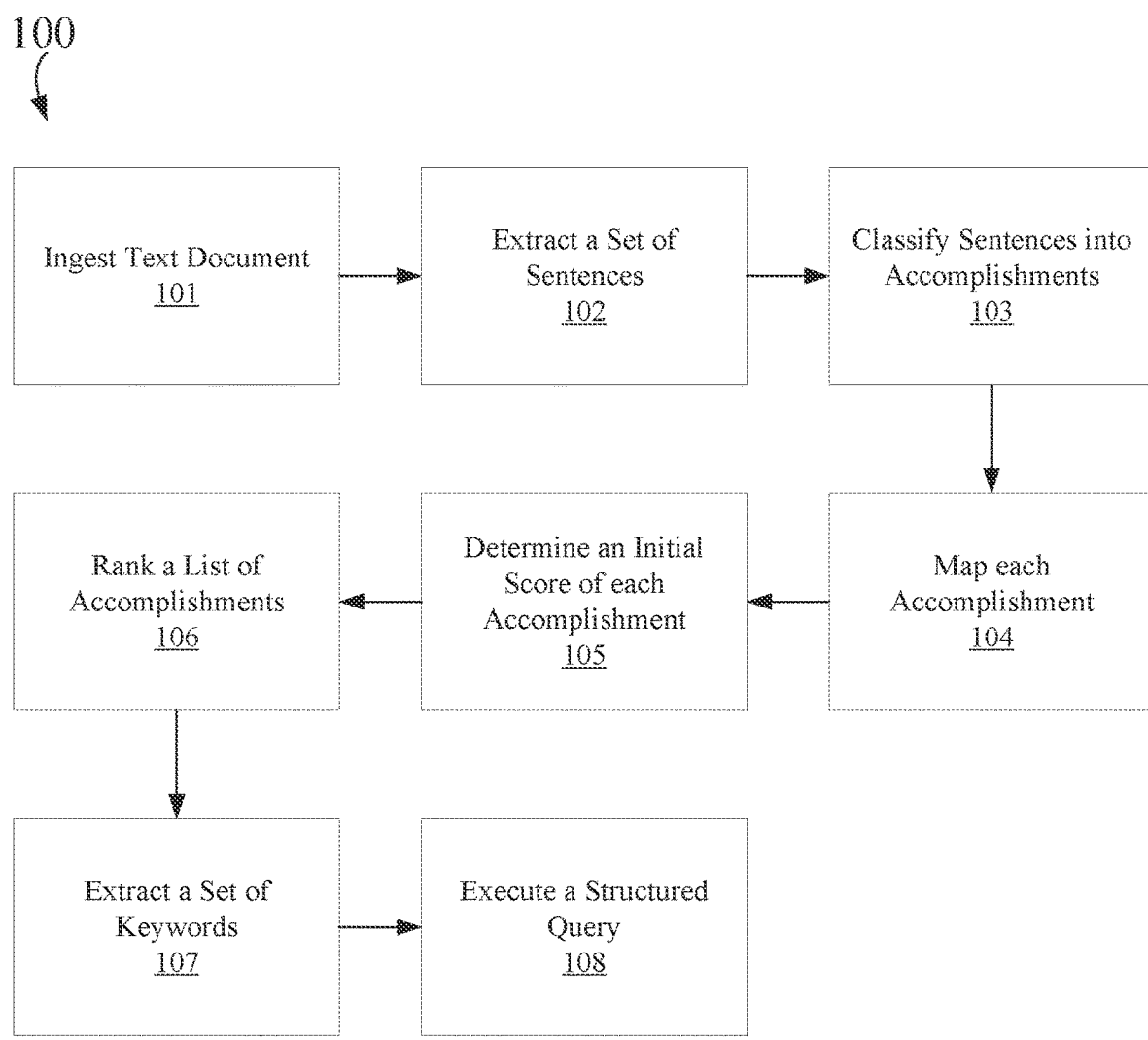
FIG. 1 illustrates a flowchart of an interactive search process.
Figure 2:
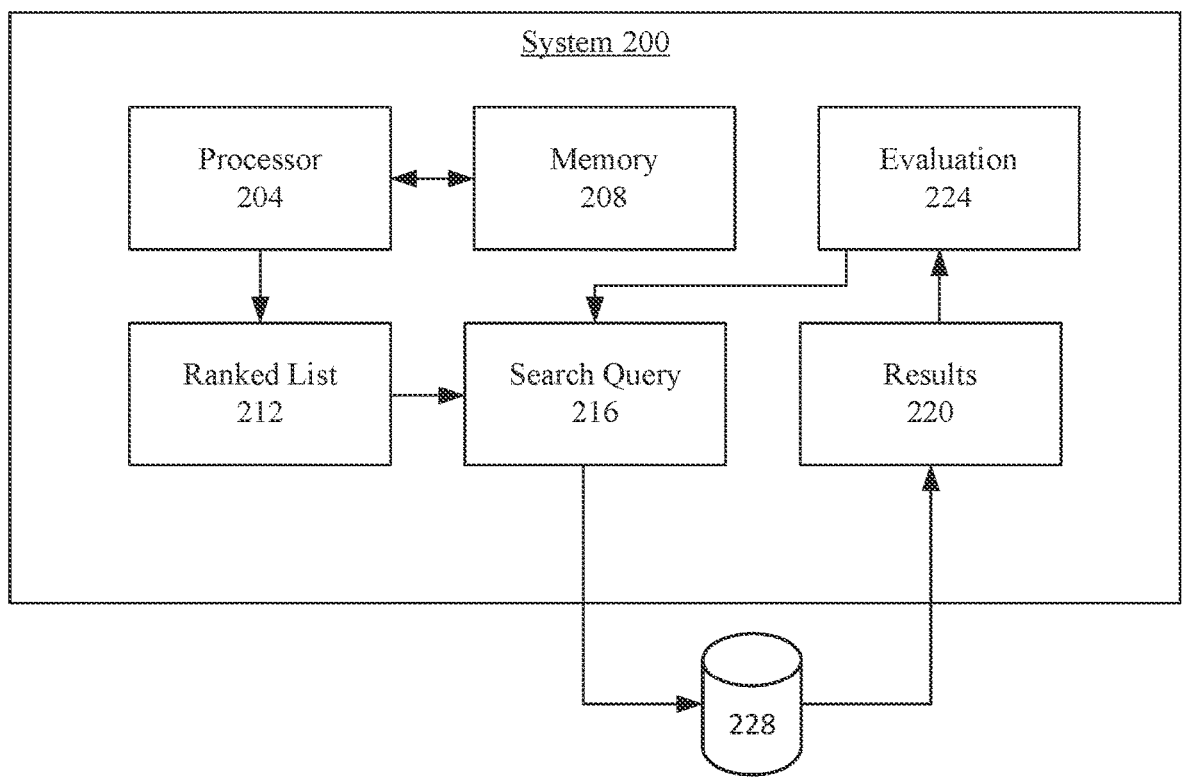
FIG. 2 illustrates a system for an iterative search.

FIGS. 1 and 2 illustrate systems and/or methods for identifying job accomplishments from job descriptions and/or processes for finding, scoring, and ranking matching candidates, in accordance with some embodiments, as described herein. For example, in some embodiments, a specific process 100 for identifying those clusters that are particularly relevant for a given job are described, as follows and depicted in FIG. 1.

Step 101: In one instantiation, a candidate search system ingests a text document that contains a job title and a job description. In some embodiments, the system may also support additional data fields such as industry preference, location, salary, education and level.

Step 102: From the input fields, the system extracts a set of sentences that may constitute the expected role tasks and responsibilities of the hired candidate.

Step 103: The system then classifies these sentences into executive level accomplishments and non-executive accomplishments using a machine learning based classification model. Some examples are as follow:
  i. Executive: "Develop company's overall sales strategy," or "Collaborate with the executive team to help launch our go to market strategy"
  ii: Non executive: "Ability to work independently as well as being a productive and supportive team member" or "have experience with Hubspot, SalesIntel, Sales Navigator, and/or SalesLoft"

Step 104: Next, the system maps each accomplishment to a list of known clusters of accomplishments. This cluster may be computed using a machine learning (e.g. k-means or word2vec) clustering model with 128 different dimensions or more.

Step 105: The system then determines the initial score of each accomplishment cluster in the corpus of accomplishments for that role using a TFIDF (term frequency inverse document frequency) scoring model.

In some embodiments, TFIDF can be broken down into two parts TF (term frequency) and IDF (inverse document frequency). TF works by looking at the frequency of a particular term a person is concerned with relative to the document. Inverse document frequency looks at how common (or uncommon) a word is amongst the corpus. The reason for using IDF is to help correct for words like "of", "as", "the", etc., since they appear frequently in an English corpus. Thus by taking inverse document frequency, the weighting of frequent terms can be minimized while making infrequent terms have a higher impact.

Step 106: The score is used to rank the list of accomplishments in the order of importance.

Step 107: The system subsequently extracts, from the list of accomplishments, a set of keywords using a text feature, language model or TFIDF keyword parser in various implementations.

Step 108: The keywords are sent as a structured query to retrieve candidates from the database.

In some embodiments, the process 100 may be repeated as needed to increase the volume of candidates found by changing the count of keywords included in the query.

In some embodiments, the process 100 may be repeated to decrease the volume of candidates found by changing the count of keywords included in the query.

In some embodiments, the process 100 may be repeated to increase the diversity of candidates found.

In some embodiments, an ensemble of queries determined based on the process 100 is used to select the set of candidates most likely to respond, most diverse or best matched across multiple queries.

Referring now to FIG. 2, a system 200 for an iterative search is presented. The system 200 may include a processor 204 and a memory 208 communicatively connected to the processor 204. The processor 204 may be configured to generate a ranked list 212 from one or more search terms associated with a job candidate search of a job candidate database 228. A job candidate search may include a web search or other search for potential employees of one or more jobs. The job candidate database 228 may include any database, such as, but not limited to, candidate resume database, job matching websites, and the like. A job candidate search may include one or more search terms. Search terms may include any semantic data that may be used to query for one or more job candidates. For instance, and without limitation, search terms may include "4 years of experience", "back-end developer", "chef", "quantitative analyst", and the like. The processor 204 may generate the ranked list 212 by receiving a set plurality of search terms and weights respectively correlating to the search terms and ranking the search terms within the plurality search terms using an inverted index so that rarer or more desirable terms are ranked higher and more prevalent or less desirable terms are ranked lower. The processor 204 may generate a plurality of clusters of job titles and/or generating a plurality of clusters of job competencies. In some embodiments, the processor 204 may determine a term frequency-inverse document frequency (TFIDF) of one or more search terms of a job candidate search, such as search query 216. The processor 204 may generate the ranked list 212 by comparing one or more search terms against a criterion. Criteria may include relevance, synonymous words, and the like. In some embodiments, ranking may be performed manually. For instance a user may select which search terms have higher influence of search results. In other embodiments, the processor 204 may learn, through a machine learning or other model, which search terms should be in which order in the ranked list 212. The processor 204 may be configured to generate a plurality of clusters of job titles and a plurality of clusters of job competencies, in an embodiment. The processor 204 may be configured to determine a (TFIDF) score of each job competency cluster for each job title cluster. The processor 204 may be configured to map a set of terms identified from a job posting to at least one of the job competency clusters and at least one of the job title clusters. The processor 204 may determine TFIDF scores of at least one job competency cluster and at least one job cluster. The processor 204 may be configured to rank search terms using TFIDF scores of at least one job competency cluster and one job title cluster, in an embodiment. In some embodiments, the processor 204 may be configured to estimate an optimal number of job title clusters using an elbow graph.

In some embodiments, the processor 204 may utilize a language processing module. A language processing module may include any hardware and/or software module. A language processing module may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

The processor 204 may generate a language processing model by any suitable method, including without limitation a natural language processing classification algorithm. A language processing model may include a natural language process classification model that enumerates and/or derives statistical relationships between input term and output terms. An algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein, are statistical models with inference algorithms that that may be applied to the models. An HMM inference algorithm, such as the forward-backward algorithm or the Viterbi algorithm, may be used to estimate the most likely discrete state given a word or sequence of words. A language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 2, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element. Vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. A degree of similarity may include any other geometric measure of distance between vectors.

Still referring to FIG. 2, the processor 204 may utilize a language processing module to identify, extract, and/or associate one or more words of one or more search terms. In some embodiments, the processor 204 may be configured to generate a search query 216 based on the ranked list 212. The search query 216 may be constructed by the processor 204 based on the ranked list 212 of search terms. The search query 216 may include one or more search terms directed to one or more categories of jobs. For instance, the search query 216 may include "experienced baker in Boston, MA". Search queries 216 may be automatically generated by the processor 204 based on the ranked list 212 of search terms. For instance, the processor 204 may auto-fill a text box of a webpage, application, and the like with a recommended search query 216 based on the ranked list 212 of search terms. In other embodiments, a user may modify and/or select search terms from the ranked list 212 of search terms, without limitation.

The processor 204 may be configured to execute the search query 216. Executing the search query 216 may include entering the search query 216 into one or more search engines, databases 228, and the like. The search query 216 may be executed automatically or through user input. The search query 216 may be executed through internet search engines, job candidate resume databases 228, and the like. The search query 216 may return one or more results 220. The results 220 of the search query 216 may include one or more resumes of potential job candidates, which may be retrieved from the database 220. Resumes may include structured data forms that may include biographic, academic, professional, and/or other information of an individual.

The processor 204 may be configured to generate an evaluation 224 of the results 220. The evaluation 224 may be constructed through evaluating a number of results 220 generated from an execution of the search query 216. Evaluating a number of results 220 may include comparing a number of results 220 to individual thresholds within a set of thresholds. Thresholds may include one or more values such as, but not limited to, total candidate size, responsiveness of candidates, diversity of candidates, and the like. As a non-limiting example, a threshold may include a total of 100 resumes of job candidates. In some embodiments, the evaluation 224 may include a determination that one or more thresholds have been exceeded, have not been exceeded, and the like. Upon an evaluation 224 that is a determination the results 220 exceed a threshold value, the processor 204 may retrieve the results 220 from the database 228. In some embodiments, the evaluation 224 may include a determination that a number of the results 220 does not exceed one or more thresholds of a set of thresholds. In such a case, the processor 204 may remove a restrictive term from the search query 216. A restrictive term may include a most limiting term that may reduce an overall number of hits from the database 228. For instance, a restrictive term may include the word "remote". In an embodiment, after removing a restrictive search term from the search query 216, the search query 216 may be rerun by the processor 204. In some embodiments, upon determining that the number of results does not exceed one or more thresholds of the set of thresholds, the processor 204 may continually remove restrictive terms from the search query 216 to form a revised search query 216. The processor 204 may re-execute the revised search query 216 until on the candidate resume database 228 until a number of results 220 generated from the execution of the revised search query 216 exceeds one or more thresholds of the set of thresholds. This process may continue indefinitely.

Still referring to FIG. 2, the processor 204 may be configured to parse job titles and/or job skills received from the database 228. Job titles may have three levels, level 1 which may be a most specific title, level 2 which may be an intermediate descriptive title, and level 3 which may be a generic title. Similarly, job skills may have three levels, level 1 which may be a specific job skill, level 2 which may be an intermediate descriptive skill, and level 3 which may be a generic skill. As a non-limiting example, a level 1 job title may be "Assistant to the Regional Manager", a level 2 job title may be "Head of Sales", and a level 3 job title may be "Salesperson". Continuing this example, a level 1 job skill may be "Olympic level powerlifting coaching", a level 2 job skill may be "powerlifting coach" and a level 3 job skill may be "fitness instructor". The processor 204 may utilize a machine learning model, classifier, language module, or other process to categorize and/or classify job titles and/or job skills to various levels. The processor 204 may be configured to receive level 3 job titles and parse the level 3 job titles into level 2 job titles. The processor 204 may compute a co-occurrence score (TFIDF) of level 2 job titles as well as or alternatively a co-occurrence score using word2vec and/or bert models. The processor 204 may be configured to normalize one or more skills based on one or more co-occurrence scores of job titles. A normalized skill may include a skill categorized to a job title, without limitation. In some embodiments, a normalized skill may be a level 2 skill with a verb tag. For instance, "fiction writing" may be a normalized skill, without limitation. In some embodiments, the processor 204 may be configured to tune one or more normalized skills of each profile of a plurality of job profiles by an elastic search. The processor 204 may pares level 2 job titles into level 1 job titles and may compute co-occurrence scores through both TGIDF and/or word2vec and/or bert models. A result of the previous described computation may be used in a normalization of one or more job skills.

In another embodiment, the processor 204 may be configured to monitor and/or scan one or more databases, such as database 228, for new job posting. The processor 204 may calculate a count of level 3 and/or level 2 job titles. The processor 204 may query and/or lookup level 2 skills based on the count of level 3 and/or level 2 job titles. The processor 204 may be configured to communicate any of the previous described data to one or more pre-trained models that may be trained to identify job titles and/or skills. The processor 204 may be configured to identify and/or send level 1 job titles and/or level 2 job titles to an elastic search of a saved query. A saved query may be saved as a json object. In some embodiments, the processor 204 may be configured to send one or more sets of skills to an elastic search of a saved query. In some embodiments, any data as described throughout this disclosure may be saved and/or communicated through one or more Docker containers.

The processor 204 may be configured to pull descriptions and/or key terms from new job postings and/or outputs of one or more pre-trained models. The processor 204 may be configured to crawl jobs data from one or more websites and parse job descriptions and job titles to strip out levels and roles into separate fields. The processor 204 may be configured to tokenize job descriptions into skill phrases starting with a verb. In some embodiments, a user may classify verb phrase into a good or bad overall classification. In other embodiments, a good or bad classification may be performed automatically through the processor 204, such as by a classifier or other model. A classifier may be generated by the processor 204 to identify good verb phrases and/or bad verb phrases. A good verb phrase may include words or sentences that are representative of a job role/title, such as "writing fiction", "drafting contracts", and the like. Bad verb phrases may include words or sentences such as "cooking lemons", "walking fishes", and the like, which may be nonsensical and/or not representative of a job title/role. In some embodiments, the processor 204 may be configured to cluster verb phrases into one or more clusters. In an embodiment, the processor 204 may be configured to cluster verb phrases into about 30,000 clusters, without limitation.

The processor 204 may be configured to score and/or rank candidates that may have been added to a matching results page, such as from results 220. The processor 204 may be configured to display scores and ranked snippets to one or more users through one or more display devices, such as, but not limited to, webpages, applications, smartphones, and the like. The processor 204 may be configured to retrieve matched candidates from the database 228 and tokenize candidate descriptions into skill phrases starting with a verb. The processor 204 may be configured to score and rank tokenized skill phrases starting with a verb of candidate descriptions.

In some embodiments, the processor 204 may be configured to receive electronic text data associated with a job. Electronic text data may include a plurality of data fields, which themselves may include a job description. The processor 204 may be configured to extract, from a plurality of data fields, a set of phrase that may include expectations associated with the job. Expectations associated with the job may include expected roles and/or responsibilities of a job candidate to be hired. In some embodiments, a plurality of data fields of electronic text data may include a job title, industry preference, location, salary and/or a level of education. The processor 204 may be configured to map each phrase of a set of phrases comprising expectations associated with a job to one or more clusters of accomplishments within a corpus of accomplishments. The processor 204 may be configured to calculate a score of one or more clusters of accomplishments. A score of one or more clusters of accomplishments may be scored using a TFIDF scoring model. In some embodiments, the processor 204 may be configured to rank one or more clusters of accomplishments based on calculated scores. The processor 204 may be configured to extract a set of keywords from a ranked cluster of accomplishments. In some embodiments, the processor 204 may be configured to construct a search query, such as search query 216. The processor 204 may be configured to execute a search query as described previously to retrieve results, such as results 220, that may include potential job candidates from the job candidate database 228. In some embodiments, the processor 204 may be configured to provide each phrase of a plurality of phrases from received electronic text data to a machine learning classification model, which the processor 204 may receive a classification of each phrase as an executive level accomplishment or a non-executive level accomplishment from.

Figure 3:
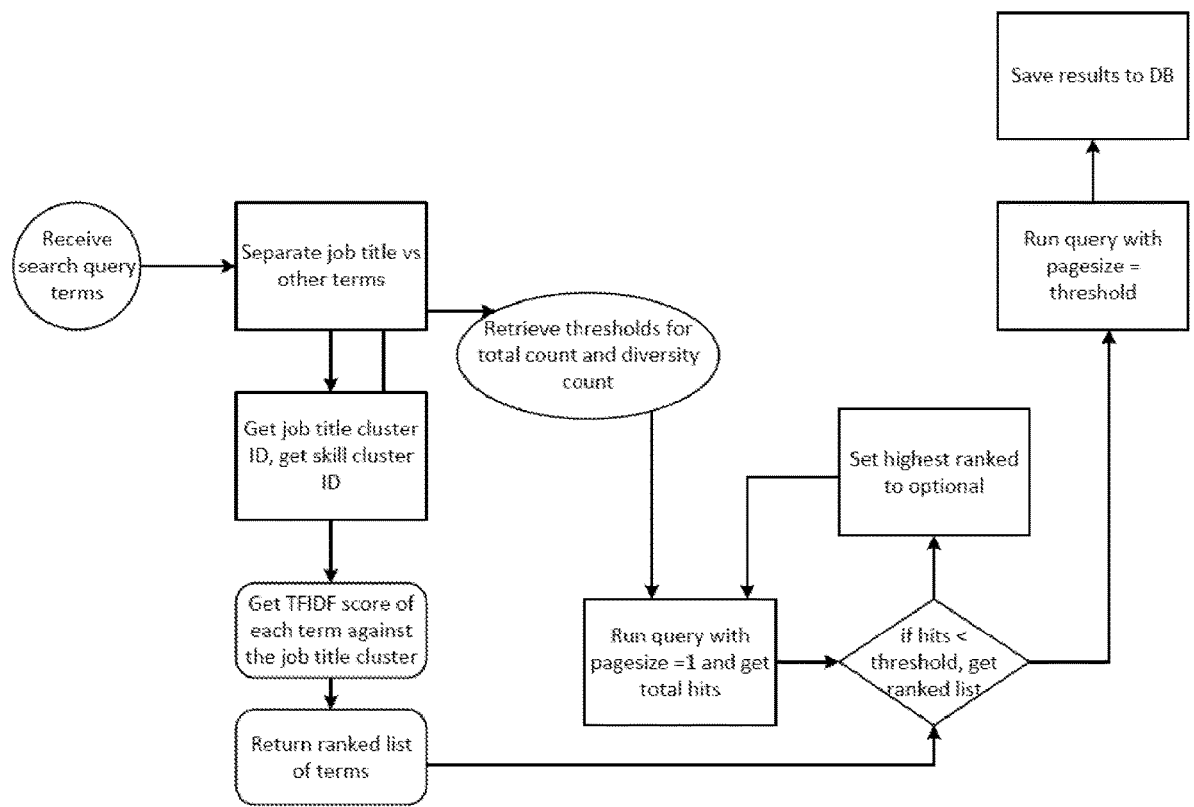
FIG. 3 illustrates an iterative search module.

Referring now to FIG. 3, a block diagram of an interactive search module is presented. The interactive search model may receive search query terms from a search query generation module. The iterative search module may separate job titles from one or more other terms. The iterative search module may retrieve thresholds for a total count and/or diversity count of the search results. In parallel or alternatively, the iterative search module may get job title cluster ID's, skill cluster ID's, and the like. The iterative search module may get a TFIDF score of each term against the job title cluster and return a ranked list of terms. The iterative search module may run a query with a certain page size and get a total number of hits. Upon a total number of hits being less than a threshold value, a ranked list may be retrieved. A highest ranked term may be set as optional and the query may be rerun indefinitely. The iterative search model may run a query with a page size equal to the threshold number and may save the results to a database.

Figure 4:
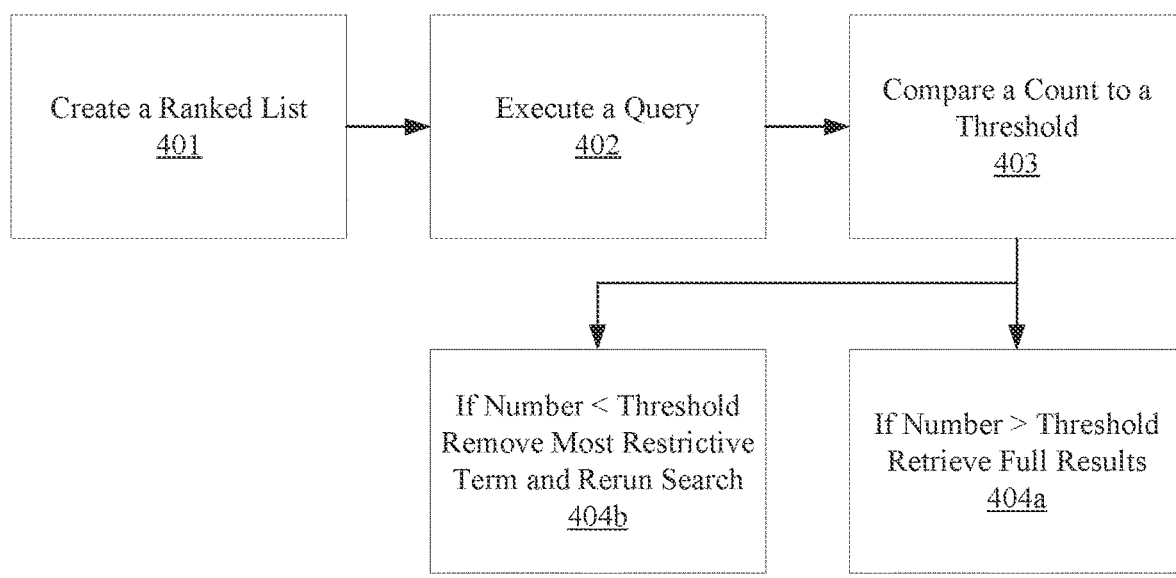
FIG. 4 illustrates another flowchart for an iterative search process.

According to the disclosure, a specific process for identifying the most desirable terms and finding a balanced number of hits may be as follows as shown in FIG. 4:

Step 401: Given a list of search terms and their correlation weight to a job, create a ranked list of terms to be used in constructing a query. The present disclosure uses an inverted index to rank the terms so that the rarest or more desirable terms are ranked high, and the less desirable or more prevalent terms are ranked low.

Step 402: Executes the query in count mode to evaluate the number of hits received on the query.

Step 403: Compare the count to a set of minimum thresholds for overall volume, diversity, responsiveness of candidates, etc.

Step 404*a*: If the number of hits is above the thresholds, proceed with retrieving the full search results.

Step 404*b*: If the number of hits is below the thresholds, remove the most restrictive term for that particular job, and reiterate the search.

In accordance with the present disclosure, the above Step 4*b* can be repeated until the count of hits is above the desired thresholds.

In some embodiments, a specific process for identifying the most desirable terms and finding a balanced number of hits is further illustrated in FIG. 1.

Model Building

Figure 5:
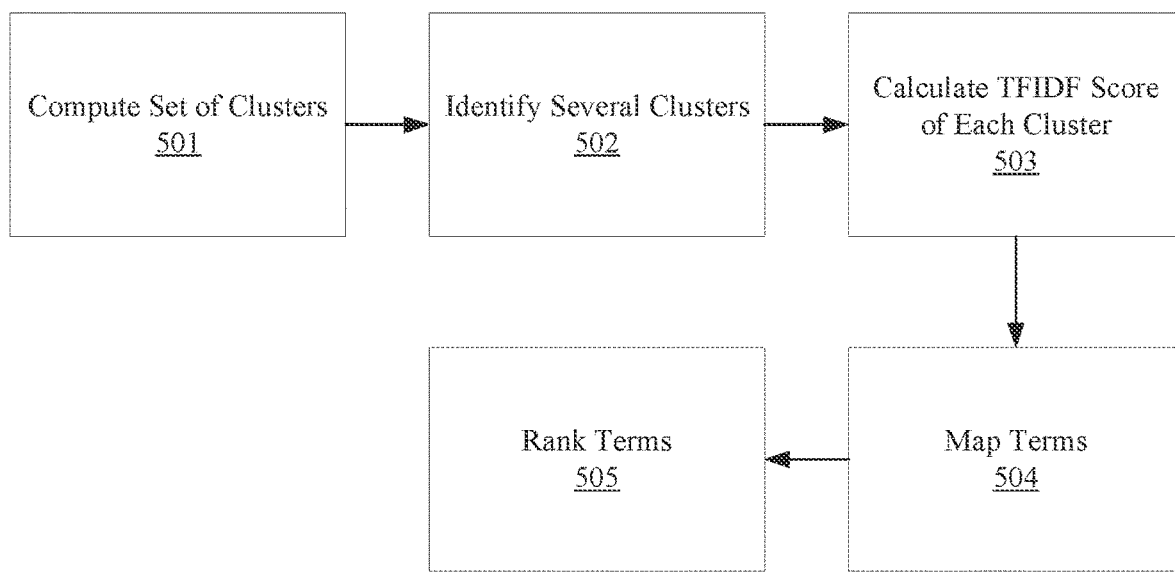
FIG. 5 illustrates a flowchart for model building.

In some embodiments, a machine learning based model may be built and used to identifying the most desirable terms to find a balanced number of hits. The specific process for building the model may be as follows as shown in FIG. 5:

Step 501: The model for search iteration begins with computing a set of clusters of job titles. The optimal number of clusters is estimated by means of an elbow graph or elbow plot that calculates the percentage of variance by the number of clusters.

In cluster analysis, the elbow method is a heuristic used in determining the number of clusters in a data set. The method consists of plotting the explained variation as a function of the number of clusters and picking the elbow of the curve as the number of clusters to use. The same method can be used to choose the number of parameters in other data-driven models, such as the number of principal components to describe a data set.

Step 502: Similarly, several clusters are identified for specific job competencies.

Step 503: The TFIDF (term frequency inverse document frequency) score of each competency cluster is then calculated for each job cluster.

Here, TFIDF can be broken down into two parts TF (term frequency) and IDF (inverse document frequency). TF works by looking at the frequency of a particular term a person is concerned with relative to the document. Inverse document frequency looks at how common (or uncommon) a word is amongst the corpus. The reason for using IDF is to help correct for words like "of", "as", "the", etc., since they appear frequently in an English corpus. Thus by taking inverse document frequency, the weighting of frequent terms can be minimized while making infrequent terms have a higher impact.

Step 504: Terms identified from a job posting are mapped at runtime to a competency cluster and a job cluster, and their TFIDF scores are calculated.

Step 505: The scores are used to rank the terms so that the most restrictive terms are ranked high, and the least restrictive terms are ranked low.

In some embodiments, the present disclosure may use other approaches to rank the terms used for search queries.

Figure 6:
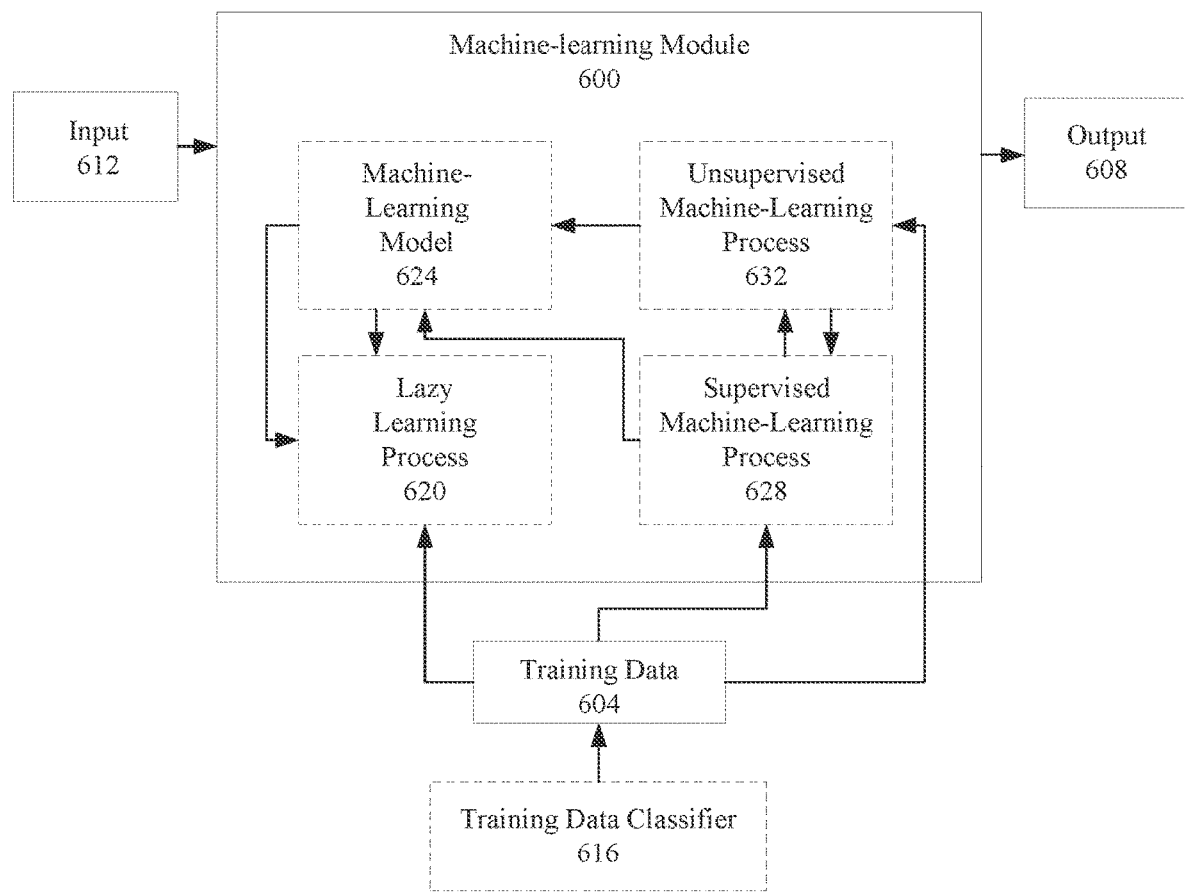
FIG. 6 illustrates a machine learning module.

Referring to FIG. 6, an exemplary machine-learning module 600 may perform machine-learning process(es) and may be configured to perform various determinations, calculations, processes and the like as described in this disclosure using a machine-learning process.

Still referring to FIG. 6, machine learning module 600 may utilize training data 604. For instance, and without limitation, training data 604 may include a plurality of data entries, each entry representing a set of data elements that were recorded, received, and/or generated together. Training data 604 may include data elements that may be correlated by shared existence in a given data entry, by proximity in a given data entry, or the like. Multiple data entries in training data 604 may demonstrate one or more trends in correlations between categories of data elements. For instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations. Correlations may indicate causative and/or predictive links between categories of data elements, which may be modeled as relationships such as mathematical relationships by machine-learning processes as described in further detail below. Training data 604 may be formatted and/or organized by categories of data elements. Training data 604 may, for instance, be organized by associating data elements with one or more descriptors corresponding to categories of data elements. As a non-limiting example, training data 604 may include data entered in standardized forms by one or more individuals, such that entry of a given data element in a given field in a form may be mapped to one or more descriptors of categories. Elements in training data 604 may be linked to descriptors of categories by tags, tokens, or other data elements. Training data 604 may be provided in fixed-length formats, formats linking positions of data to categories such as comma-separated value (CSV) formats and/or self-describing formats. Self-describing formats may include, without limitation, extensible markup language (XML), JavaScript Object Notation (JSON), or the like, which may enable processes or devices to detect categories of data.

With continued reference to refer to FIG. 6, training data 604 may include one or more elements that are not categorized. Uncategorized data of training data 604 may include data that may not be formatted or containing descriptors for some elements of data. In some embodiments, machine-learning algorithms and/or other processes may sort training data 604 according to one or more categorizations. Machine-learning algorithms may sort training data 604 using, for instance, natural language processing algorithms, tokenization, detection of correlated values in raw data and the like. In some embodiments, categories of training data 604 may be generated using correlation and/or other processing algorithms. As a non-limiting example, in a body of text, phrases making up a number "n" of compound words, such as nouns modified by other nouns, may be identified according to a statistically significant prevalence of n-grams containing such words in a particular order. For instance, an n-gram may be categorized as an element of language such as a "word" to be tracked similarly to single words, which may generate a new category as a result of statistical analysis. In a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure, without limitation.

Further referring to FIG. 6, training data 604 may be filtered, sorted, and/or selected using one or more supervised and/or unsupervised machine-learning processes and/or models as described in further detail below. In some embodiments, training data 604 may be classified using training data classifier 616. Training data classifier 616 may include a classifier. A "classifier" as used in this disclosure is a machine-learning model that sorts inputs into one or more categories. Training data classifier 616 may utilize a mathematical model, neural net, or program generated by a machine learning algorithm. A machine learning algorithm of training data classifier 616 may include a classification algorithm. A "classification algorithm" as used in this disclosure is one or more computer processes that generate a classifier from training data. A classification algorithm may sort inputs into categories and/or bins of data. A classification algorithm may output categories of data and/or labels associated with the data. A classifier may be configured to output a datum that labels or otherwise identifies a set of data that may be clustered together. Machine-learning module 600 may generate a classifier, such as training data classifier 616 using a classification algorithm. Classification may be performed using, without limitation, linear classifiers such as without limitation logistic regression and/or naive Bayes classifiers, nearest neighbor classifiers such ask-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to one or more faces.

Still referring to FIG. 6, machine-learning module 600 may be configured to perform a lazy-learning process 620 which may include a "lazy loading" or "call-when-needed" process and/or protocol. A "lazy-learning process" may include a process in which machine learning is performed upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naive Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Still referring to FIG. 6, machine-learning processes as described in this disclosure may be used to generate machine-learning models 624. A "machine-learning model" as used in this disclosure is a mathematical and/or algorithmic representation of a relationship between inputs and outputs, as generated using any machine-learning process including without limitation any process as described above, and stored in memory. For instance, an input may be sent to machine-learning model 624, which once created, may generate an output as a function of a relationship that was derived. For instance, and without limitation, a linear regression model, generated using a linear regression algorithm, may compute a linear combination of input data using coefficients derived during machine-learning processes to calculate an output. As a further non-limiting example, machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include supervised machine-learning process 628. A "supervised machine learning process" as used in this disclosure is one or more algorithms that receive labelled input data and generate outputs according to the labelled input data. For instance, supervised machine learning process 628 may include search terms as described above as inputs, search queries of images as outputs, and a scoring function representing a desired form of relationship to be detected between inputs and outputs. A scoring function may maximize a probability that a given input and/or combination of elements inputs is associated with a given output to minimize a probability that a given input is not associated with a given output. A scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include unsupervised machine-learning processes 632. An "unsupervised machine-learning process" as used in this disclosure is a process that calculates relationships in one or more datasets without labelled training data. Unsupervised machine-learning process 632 may be free to discover any structure, relationship, and/or correlation provided in training data 604. Unsupervised machine-learning process 632 may not require a response variable. Unsupervised machine-learning process 632 may calculate patterns, inferences, correlations, and the like between two or more variables of training data 604. In some embodiments, unsupervised machine-learning process 632 may determine a degree of correlation between two or more elements of training data 604.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm). Coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of I divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought. Similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Computer Implementation

In general, the methods and systems as described herein can be performed on one or more computing devices.

For example, the development and/or deployment of machine learning models as described herein can be implemented in hardware or software, or a combination of both. In some embodiments, a machine-readable storage medium is provided, the medium comprising a data storage material encoded with machine readable data which, when using a machine programmed with instructions for using said data, is capable of executing the training or deployment of machine learning models and/or displaying any of the datasets or results described herein. The machine learning models as described herein can be implemented in computer programs executing on programmable computers, comprising a processor, a data storage system (including volatile and non-volatile memory and/or storage elements), a graphics adapter, a pointing device, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high-level procedural or object-oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The data used in connection with the present invention can be recorded on computer readable media, e.g. any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. Any convenient data storage structure can be chosen, based on the means used to access the stored information. A variety of data processor programs and formats can be used for storage, e.g. word processing text file, database format, etc.

Processors suitable for the execution of the systems and methods in the presently disclosed embodiments include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

In some embodiments, the systems and methods as described herein are performed on one or more computers in a distributed computing system environment (e.g., in a cloud computing environment). In this description, "cloud computing" is defined as a model for enabling on-demand network access to a shared set of configurable computing resources. Cloud computing can be employed to offer on-demand access to the shared set of configurable computing resources. The shared set of configurable computing resources can be rapidly provisioned via virtualization and released with low management effort or service provider interaction, and then scaled accordingly. A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Examples of a computing device include a personal computer, desktop computer laptop, server computer, a computing node within a cluster, message processors, hand-held devices, multi-processor systems, microprocessor-based or programmable consumer electronics, network PCs, minicomputers, mainframe computers, mobile telephones, PDAs, tablets, pagers, routers, switches, and the like.

Figure 7:
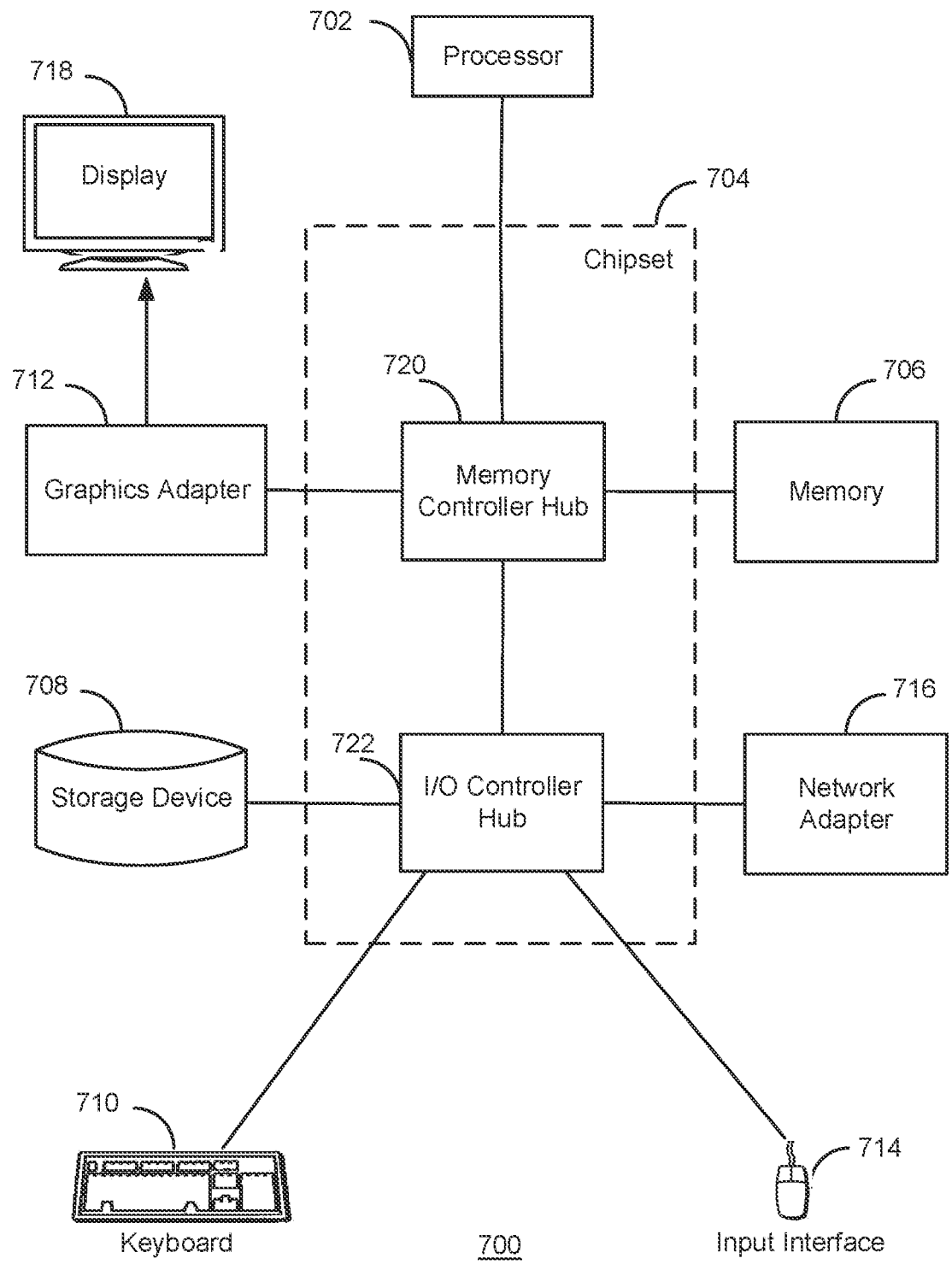
FIG. 7 illustrates an example computer system for implementing the systems and methods as described herein.

FIG. 7 illustrates an example computer for implementing the systems and methods as described herein. In some embodiments, the computing device includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, an input interface 714, and network adapter 716 are coupled to the I/O controller hub 722. Other embodiments of the computing device have different architectures.

The storage device 708 is a non-transitory computer-readable storage medium such as a hard drive, compact disk read-only memory (CD-ROM), DVD, or a solid-state memory device. The memory 706 holds instructions and data used by the processor 702. The input interface 714 is a touch-screen interface, a mouse, track ball, or other type of input interface, a keyboard, or some combination thereof, and is used to input data into the computing device. In some embodiments, the computing device may be configured to receive input (e.g., commands) from the input interface 714 via gestures from the user. The graphics adapter 712 displays images and other information on the display 718. The network adapter 716 couples the computing device to one or more computer networks.

The graphics adapter 712 displays representations, graphs, tables, and other information on the display 718. In various embodiments, the display 718 is configured such that the user (e.g., data scientists, data owners, data partners) may input user selections on the display 718. In one embodiment, the display 718 may include a touch interface. In various embodiments, the display 718 can show one or more predicted lead time for providing a customer order.

The computing device 700 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 708, loaded into the memory 706, and executed by the processor 702.

The types of computing devices 700 can vary from the embodiments described herein. For example, the system 200 can run in a single computer 700 or multiple computers 700 communicating with each other through a network such as in a server farm. In another example, the computing device 700 can lack some of the components described above, such as graphics adapters 712, input interface 714, and displays 718.

Definitions

The phraseology and terminology used herein is for the purpose of description and should not be regarded as limiting. The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The term "machine learning library" refer to a collection of pre-written code that can be used in a program to perform a specific task or set of tasks in programming. In some embodiments, a machine learning library includes software that provides tools and functions for building, training, or deploying machine learning models. In some embodiments, a machine learning library may be provided as a way for programmers to reuse code that has already been written and tested, so as to not having to write all of the code from scratch every time it is needed. Example machine learning libraries as described herein may include NumPy, Matplotlib, Pandas, Scikit-Learn, TensorFlow, PyTorch, and/or Keras.

The terms "data," "content," "information" and similar terms may be used interchangeably to refer to data capable of being captured, transmitted, received, displayed and/or stored in accordance with various examples.

The terms "about" or "substantially" that modify a condition or relationship characteristic of a feature or features of an embodiment of the invention, are to be understood to mean that the condition or characteristic is defined to within tolerances that are acceptable for operation of the embodiment for an application for which it is intended. For example, the terms "about," "substantially," and/or "close" with respect to a magnitude or a numerical value may imply to be within an inclusive range of −10% to +10% of the respective magnitude or value.

It must be noted that, as used in the specification, the singular forms "a," "an" and "the" include plural referents unless the context clearly dictates otherwise. By way of example, "an analogue" means one analogue or more than one analogue.

Each numerical value presented herein is contemplated to represent a minimum value or a maximum value in a range for a corresponding parameter. Accordingly, when added to the claims, the numerical value provides express support for claiming the range, which may lie above or below the numerical value, in accordance with the teachings herein. Every value between the minimum value and the maximum value within each numerical range presented herein (including in the figures), is contemplated and expressly supported herein, subject to the number of significant digits expressed in each particular range. Absent express inclusion in the claims, each numerical value presented herein is not to be considered limiting in any regard.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive. The terms and expressions employed herein are used as terms and expressions of description and not of limitation and there is no intention, in the use of such terms and expressions, of excluding any equivalents of the features shown and described or portions thereof. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously.

The invention claimed is:

1. A computer-implemented method for iterative search of a candidate resume database, the method comprising:
    training a machine learning model with training data, wherein the training data correlates sets of sentences to executive level accomplishments and non-executive accomplishments;
    tokenizing a text document to produce tokens, wherein the text document includes a job title and a job description;
    extracting a set of sentences from the tokens;
    classifying, by the machine learning model, the set of sentences to the executive level accomplishments and the non-executive level accomplishments based on the training of the machine learning model;
    mapping, by the machine learning model, each accomplishment of the executive level and non-executive level accomplishments to a list of one or more clusters of accomplishments;
    calculating a score of each of the one or more clusters of accomplishments;
    ranking the clusters of accomplishments based on the calculated scores;
    extracting a set of keywords from the ranked clusters of accomplishments;
    generating a ranked list of search terms associated with a job candidate search based on the set of keywords;
    constructing a search query of the candidate resume database based on the ranked list of search terms;
    executing the search query on the candidate resume database in a count mode to generate a number of results;
    evaluating the number of results generated from the execution of the search query by comparing the number of results to individual thresholds within a set of thresholds;
    upon determining that the number of results exceeds one or more thresholds of the set of thresholds, retrieving the number of results from the candidate resume database;
    upon determining that the number of results does not exceed one or more thresholds of the set of thresholds, removing a restrictive term from the search query; and
    executing a revised search query based on the removal of the restrictive term.

2. The method of claim 1, wherein the thresholds are based on one or more of overall volume, diversity, and responsiveness of candidates.

3. The method of claim 1, further comprising:
pulling job descriptions from new job postings;
tokenizing the job descriptions into skill phrases; and
classifying, by the machine learning model, the skill phrases into good verb phrases and bad verb phrases.

4. The method of claim 1, wherein upon determining that the number of results does not exceed one or more thresholds of the set of thresholds, the method further comprises: continuing to remove restrictive terms from the search query to form a revised search query and re-execute the revised search query on the candidate resume database until a number of results generated from the execution of the revised search query exceeds one or more thresholds of the set of thresholds.

5. The method of claim 1, wherein generating the ranked list of search terms comprises:
generating a plurality of clusters of job titles;
generating a plurality of clusters of job competencies;
determining a term frequency—inverse document frequency (TFIDF) score of each job competency cluster for each job title cluster;
mapping a set of terms identified from a job posting to at least one of the job competency clusters and at least one of the job title clusters;
determining TFIDF scores of the at least one job competency cluster and the at least one job cluster; and
ranking the search terms using the TFIDF scores of the at least one job competency cluster and the at least one job title cluster.

6. The method of claim 1, further comprising estimating an optimal number of job title clusters using an elbow graph.

7. The method of claim 1, further comprising classifying, by the machine learning model, job titles of the text document to job title levels.

8. The method of claim 1, wherein the text document further includes an industry preference, a location, a salary, and/or a level of education.

9. The method of claim 1, further comprising generating the ranked list by comparing weights of search terms against each other.

10. The method of claim 1, further comprising extracting a skill from the text document and normalizing the skill to a job title.

11. The method of claim 1, further comprising classifying, by the machine learning model, job skills to job skill levels.

12. A system for an iterative search of a candidate resume database, comprising:
a processor; and
a memory communicatively connected to the processor, the memory containing instructions configured the processor to:
train a machine learning model with training data, wherein the training data correlates sets of sentences to executive level accomplishments and non-executive accomplishments;
tokenize a text document to produce tokens, wherein the text document includes a job title and a job description;
extract a set of sentences from the tokens;
classify, by the machine learning model, the set of sentences to the executive level accomplishments and the non-executive level accomplishments based on the training of the machine learning model;
map, by the machine learning model, each accomplishment of the executive level and non-executive level accomplishments to a list of one or more clusters of accomplishments;
calculate a score of each of the one or more clusters of accomplishments;
rank the clusters of accomplishments based on the calculated scores;
extract a set of keywords from the ranked clusters of accomplishments
generate a ranked list of search terms associated with a job candidate search based on the set of keywords;
construct a search query of the candidate resume database based on the ranked list of search terms;
execute the search query on the candidate resume database in a count mode to generate a number of results;
evaluate the number of results generated from the execution of the search query by comparing the number of results to individual thresholds within a set of thresholds;
upon determining that the number of results exceeds one or more thresholds of the set of thresholds, retrieve the number of results from the candidate resume database;
upon determining that the number of results does not exceed one or more thresholds of the set of thresholds, remove a restrictive term from the search query; and
execute a revised search query based on the removal of the restrictive term.

13. The system of claim 12, wherein the thresholds are based on one or more of overall volume, diversity, and responsiveness of candidates.

14. The system of claim 12, wherein the processor is further configured to:
pull job descriptions from new job postings;
tokenize the job descriptions into skill phrases; and
classify, by the machine learning model, the skill phrases into good verb phrases and bad verb phrases.

15. The system of claim 12, wherein upon determining that the number of results does not exceed one or more thresholds of the set of thresholds, the processor is further configured to: continue to remove restrictive terms from the search query to form a revised search query; and re-execute the revised search query on the candidate resume database until a number of results generated from the execution of the revised search query exceeds one or more thresholds of the set of thresholds.

16. The system of claim 12, wherein the processor is further configured to:
generate a plurality of clusters of job titles;
generate a plurality of clusters of job competencies;
determine a term frequency—inverse document frequency (TFIDF) score of each job competency cluster for each job title cluster;
map a set of terms identified from a job posting to at least one of the job competency clusters and at least one of the job title clusters;
determine TFIDF scores of the at least one job competency cluster and the at least one job cluster; and
rank the search terms using the TFIDF scores of the at least one job competency cluster and the at least one job title cluster.

17. The system of claim 12, wherein the processor is further configured to estimate an optimal number of job title clusters using an elbow graph.

* * * * *